(12) United States Patent
Lin et al.

(10) Patent No.: US 11,823,635 B2
(45) Date of Patent: Nov. 21, 2023

(54) LED BACKLIGHT DRIVER AND LED DRIVER OF DISPLAY PIXELS

(71) Applicant: NOVATEK Microelectronics Corp., Hsin-Chu (TW)

(72) Inventors: Chun-Fu Lin, Taoyuan (TW); Hsing-Kuo Chao, Hsinchu County (TW); Jhih-Siou Cheng, New Taipei (TW); Ju-Lin Huang, Hsinchu County (TW); Wen-Hsin Cheng, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 193 days.

(21) Appl. No.: 17/467,443

(22) Filed: Sep. 6, 2021

(65) Prior Publication Data
US 2022/0122552 A1 Apr. 21, 2022

Related U.S. Application Data

(60) Provisional application No. 63/151,813, filed on Feb. 22, 2021, provisional application No. 63/092,439, filed on Oct. 15, 2020.

(51) Int. Cl.
*G09G 3/30* (2006.01)
*G09G 3/34* (2006.01)
*G02F 1/1335* (2006.01)
*G02F 1/13357* (2006.01)

(52) U.S. Cl.
CPC ..... *G09G 3/3426* (2013.01); *G02F 1/133603* (2013.01); *G02F 1/133612* (2021.01); *G02F 1/133628* (2021.01); *G09G 2300/0408* (2013.01)

(58) Field of Classification Search
CPC ......... G09G 3/3426; G09G 2300/0408; G09G 3/3406; G09G 3/32; G09G 3/30; G02F 1/133603; G02F 1/133612; G02F 1/133628
See application file for complete search history.

(56) References Cited

U.S. PATENT DOCUMENTS

| | | | |
|---|---|---|---|
| 2014/0217426 A1 | 8/2014 | Inokuchi | |
| 2017/0004773 A1* | 1/2017 | Kim | ............... G09G 3/3258 |
| 2018/0061294 A1 | 3/2018 | Kim | |
| 2018/0180791 A1 | 6/2018 | Kang | |
| 2018/0182935 A1 | 6/2018 | Kwon | |
| 2019/0204651 A1 | 7/2019 | Bai | |
| 2019/0204669 A1 | 7/2019 | Lee | |
| 2020/0100362 A1 | 3/2020 | Yamaguchi | |
| 2021/0004103 A1* | 1/2021 | Jang | ............... G06F 3/04184 |

(Continued)

FOREIGN PATENT DOCUMENTS

| | | |
|---|---|---|
| CN | 1638103 A | 7/2005 |
| CN | 106328027 A | 1/2017 |
| CN | 107247372 A | 10/2017 |

(Continued)

*Primary Examiner* — Pegeman Karimi

(74) *Attorney, Agent, or Firm* — Winston Hsu

(57) ABSTRACT

An LED backlight driver includes at least one driving chip configured to drive a backlight module. The at least one driving chip is disposed on at least one chip-on-film package, and not in direct contact with the backlight module to reduce heat transfer to the backlight module.

19 Claims, 11 Drawing Sheets

(56) References Cited

U.S. PATENT DOCUMENTS

2021/0033925 A1* 2/2021 Kim .................. G02F 1/133305
2021/0035507 A1 2/2021 Koo

FOREIGN PATENT DOCUMENTS

| CN | 107978690 A | 5/2018 |
| CN | 108008584 A | 5/2018 |
| CN | 110223629 A | 9/2019 |
| TW | 201821846 A | 6/2018 |
| TW | I686634 B | 3/2020 |
| TW | 202018457 A | 5/2020 |
| TW | 202022283 A | 6/2020 |
| TW | 202035910 A | 10/2020 |
| WO | 2019/127705 A1 | 7/2019 |

* cited by examiner

LED BACKLIGHT DRIVER AND LED DRIVER OF DISPLAY PIXELS

CROSS REFERENCE TO RELATED APPLICATIONS

This application claims the benefit of U.S. provisional application No. 63/092,439 filed on Oct. 15, 2020, and U.S. provisional application No. 63/151,813 filed on Feb. 22, 2021, which are all incorporated herein by reference.

BACKGROUND OF THE INVENTION

1. Field of the Invention

The present invention relates to a backlight driver and an LED driver of display pixels, and more particularly, to a backlight driver and an LED driver of display pixels to improve the reliability of a backlight module and/or alleviate the color cast problem.

2. Description of the Prior Art

In a conventional display apparatus including a liquid crystal display (LCD) panel and a light-emitting diode (LED) backlight module, an LED driving chip is soldered directly to the back surface of the LED backlight module in a conventional wire bonding package manner (such as quad flat no-lead (QFN) or shrink small-outline package (SSOP)). Because an LED of the LED backlight module is driven by a constant current, the LED driving chip consumes considerable power when the LEDs are lit. The conventional package is unable to readily/efficiently release the consumed power to the surroundings due to its cooling capacity, and therefore the LED driving chip becomes a heating source on the LED backlight module. When the temperature of the LED driving chip is high, it may seriously affect the LEDs on the front surface of the LED backlight module, which shortens the service life of the LEDs and causes a color cast problem for the LEDs in overheated area(s) on the LED backlight module.

FIG. 11 is a schematic diagram of a conventional display apparatus 14. LED driving chips 1410P, a timing controller 270T, a power control module 270D, and a power manager circuit 270W, which are disposed on a control PCB 270, release heat affecting each other. Moreover, the presence of the LED driving chips 1410P on the control PCB 270 makes the control PCB 270 bulky. When the number of backlight local dimming zones grows, the number of the LED driving chips 1410P and the number of pins of FFC/FPC connection line 490N increase. On the other hand, the maximum size of the control PCB 270 limits the number of the LED driving chips 1410P and thus the number of backlight local dimming zones.

Consequently, there is still room for improvement when it comes to the configuration/operation of an LED backlight driver.

SUMMARY OF THE INVENTION

In order to solve aforementioned problem(s), the present invention provides a backlight driver and an LED driver of display pixels, which improve the reliability of a backlight module and/or alleviates the color cast problem.

The present invention discloses a light emitting diode (LED) backlight driver, comprising at least one driving chip, configured to drive a backlight module, wherein the at least one driving chip is disposed on at least one chip-on-film (COF) package, and not in direct contact with the backlight module to reduce heat transfer to the backlight module.

The present invention discloses a light emitting diode (LED) display driver, for driving display pixels, comprising at least one driving chip, configured to drive the display pixels of an LED display panel, wherein the at least one driving chip is disposed on at least one chip-on-film (COF) package, and not in direct contact with the LED display panel to reduce heat transfer to the LED display panel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
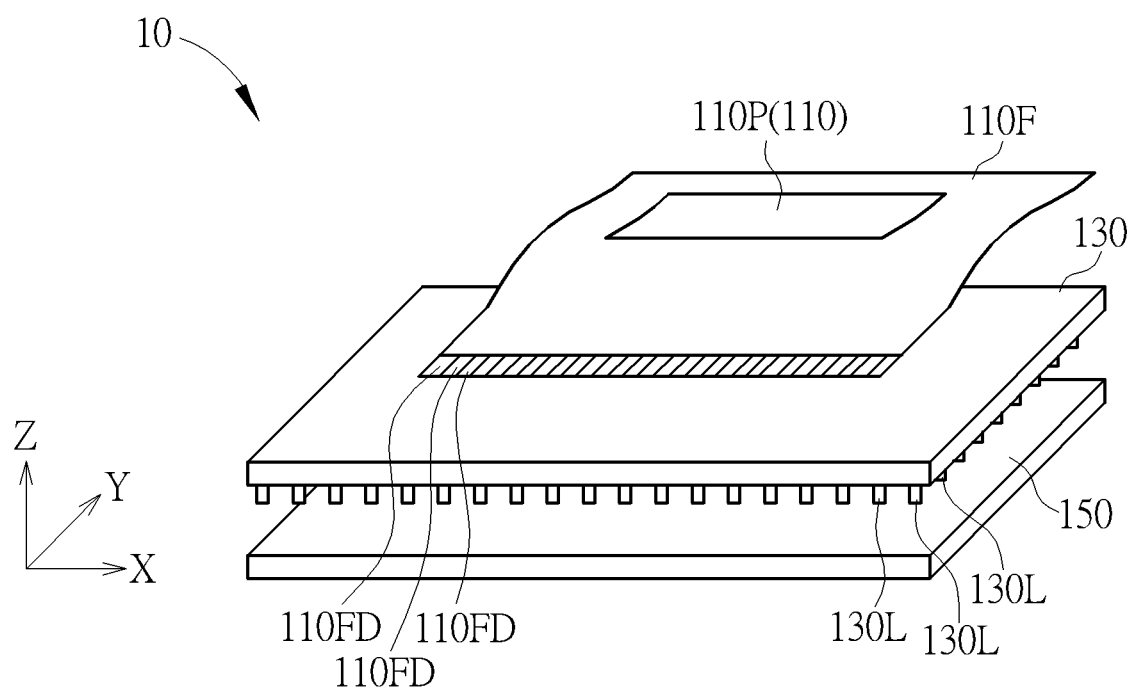
FIGS. 1-10 are schematic diagrams of display apparatuses according to an embodiment of the present invention respectively.

FIG. 1 is a schematic diagram of a display apparatus 10 according to an embodiment of the present invention. The display apparatus 10 may include a backlight driver 110, a backlight module 130, and/or a display panel 150.

The backlight driver 110, which adopts a chip-on-film (COF) package, may include a COF package 110F and/or a driving chip 110P configured to drive the backlight module 130. The driving chip 110P is disposed on the COF package 110F instead of directly on the backlight module 130. The driving chip 110P may thus be not in direct contact with the backlight module 130 to reduce/block heat transfer to the backlight module. This, for example, improves the reliability of the backlight module 130 and/or alleviates a color cast problem of light emitters 130L of the backlight module 130 caused by the driving chip 110P.

The COF package 110F (on its first surface) is bonded to a first surface 130F1 of the backlight module 130, and the light emitters 130L are bonded to a second surface 130F2 of the backlight module 130 opposite to the first surface 130F1. The driving chip 110P may be disposed on a second surface of the COF package 110F away from the light emitters 130L to prevent the temperature of the driving chip 110P from impairing the operation/function of the light emitters 130L.

The backlight module 130 (or the display panel 150) may include a rigid substrate (such as a printed circuit board (PCB) or a glass substrate) and thus have permanent shape and form. On the other hand, the COF package 110F is flexible but securely carries the driving chip 110P built onto it. The COF package 110F may be implemented by a flexible film such as a chip-on film.

In this embodiment, each light emitter 130L of the backlight module 130 may be a light emitting diode (LED) or a mini LED, and the display panel 150 may be a liquid-crystal display (LCD) panel. In another embodiment, each light emitter 130L, which is disposed behind the display panel 150 to illuminate the display panel 150, may be an organic light-emitting diode (OLED), but is not limited thereto.

Figure 2:
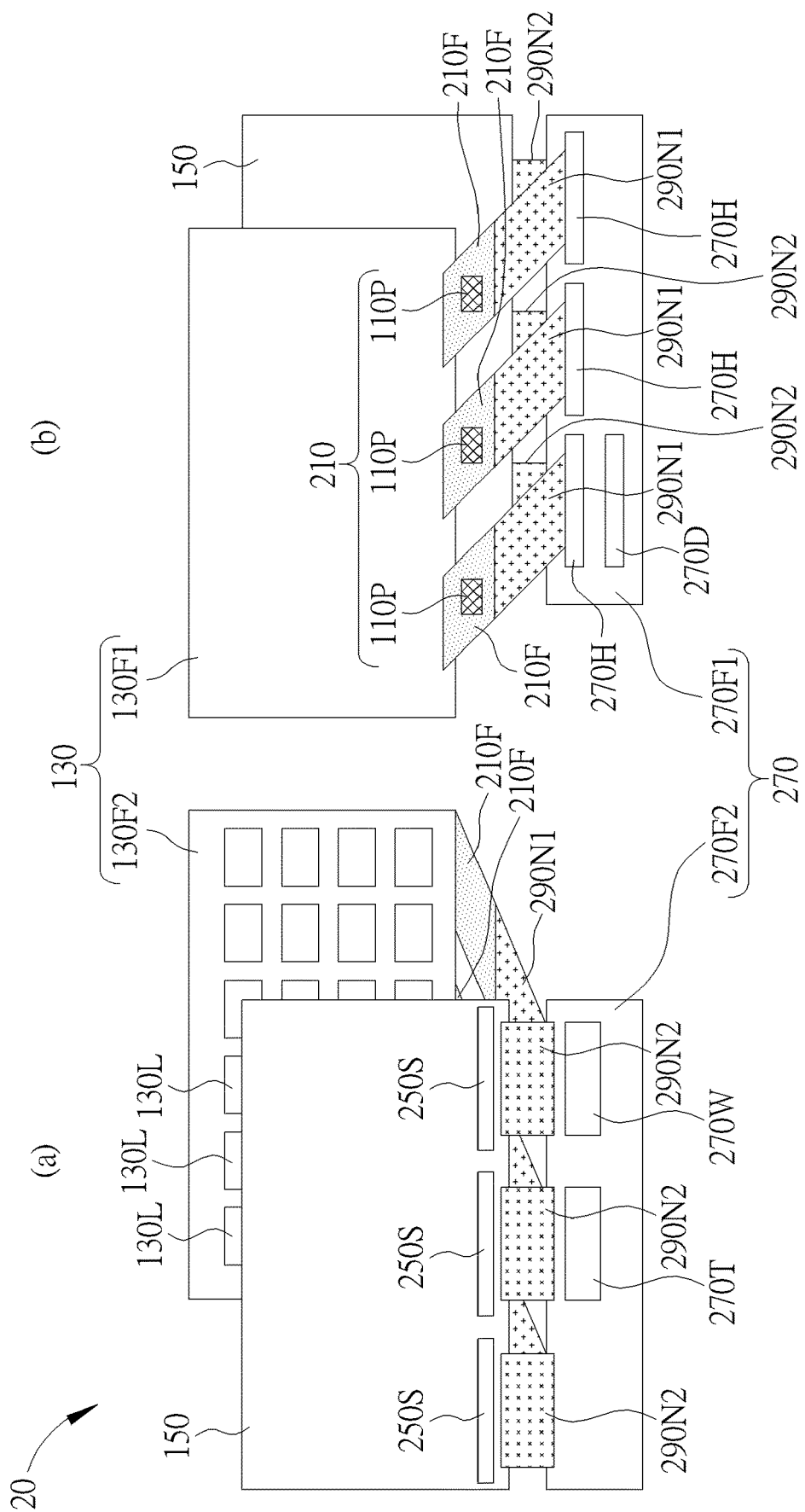

FIG. 2 is a schematic diagram of a display apparatus 20 according to an embodiment of the present invention. FIG. 2a and FIG. 2b illustrate the display apparatus 20 in different views. The display apparatus 20 may include a backlight driver 210, the backlight module 130, the display panel 150, a control PCB 270, and/or connection lines 290N1, 290N2.

The backlight driver 210 may include more than one driving chip 110P being aligned to form a one-dimensional array and/or more than one COF package 210F bonded along (merely) one edge of the backlight module 130. The driving chips 110P, respectively disposed on the COF packages 210F, are absent from the control PCB 270 to free up more space on the control PCB 270. And the number of the driving chips 110P is not limited by the maximum size of the control PCB 270. The driving chips 110P, respectively disposed on the COF packages 210F, may be set apart from the light emitters 130L of the backlight module 130 to improve heat issues.

Connector heads 270H and a power control module 270D are disposed on a surface 270F1 of the control PCB 270; a timing controller 270T and a power manager circuit 270W are disposed on a surface 270F2 of the control PCB 270. The driving chips 110P mount on the COF packages 210F may be not in direct contact with the control PCB 270 to reduce heat transfer to the control PCB 270. Heat released by the driving chips 110P may not affect the power control module 270D, the timing controller 270T, or the power manager circuit 270W, and vice versa. The driving chips 110P may be away from the control PCB 270 to prevent from interfering with the operation of the timing controller 270T.

Figure 11:
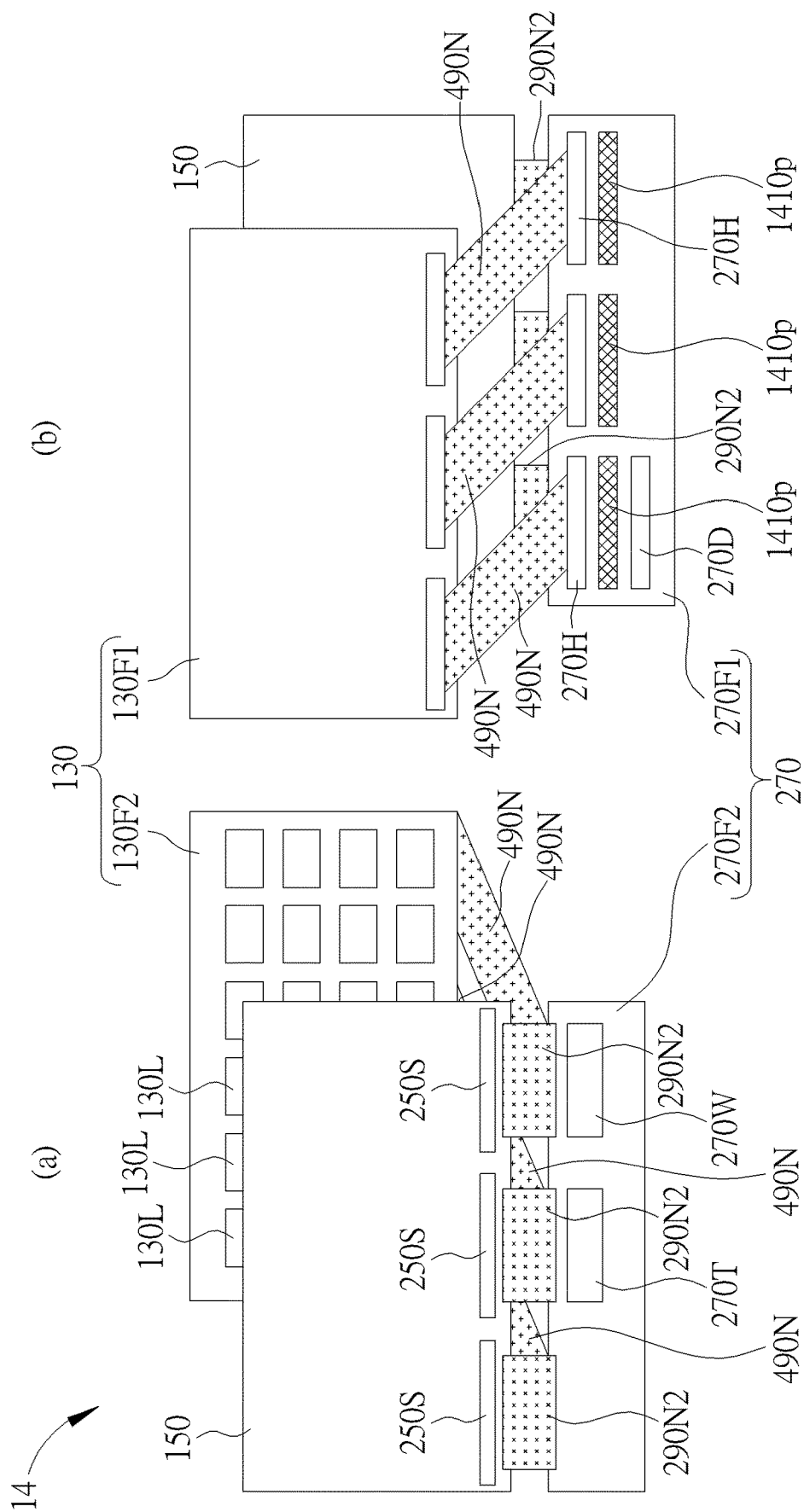
FIG. 11 is a schematic diagram of a conventional display apparatus.

There may be no conventional FFC/FPC connection line (shown, for example, in FIG. 11) disposed between the backlight module 130 and the control PCB 270. For example, one driving chip 110P is fabricated in the approach of COF packaging with one COF package 210F. One end of the COF package 210F may be attached to the backlight module 130 by using anisotropic conductive adhesives. Moreover, the other end of the COF package 210F is bonded to one connection line 290N1, which may be plugged/fastened to one connector (head) 270H, so as to attach/connect to the control PCB 270. Each connection line 290N1 may be a flexible printed circuit (FPC) or a flexible flat cable (FFC). In other words, a conventional FFC/FPC connection line is replaced with the combination of the COF package 210F and the connection line 290N1. These facilitate the design of the control PCB 270.

The timing controller 270T on the control PCB 270 may be connected to source drivers 250S of the display panel 150 through the connection lines 290N2. Each connection line 290N2 may be an FPC or an FFC.

Figure 3:
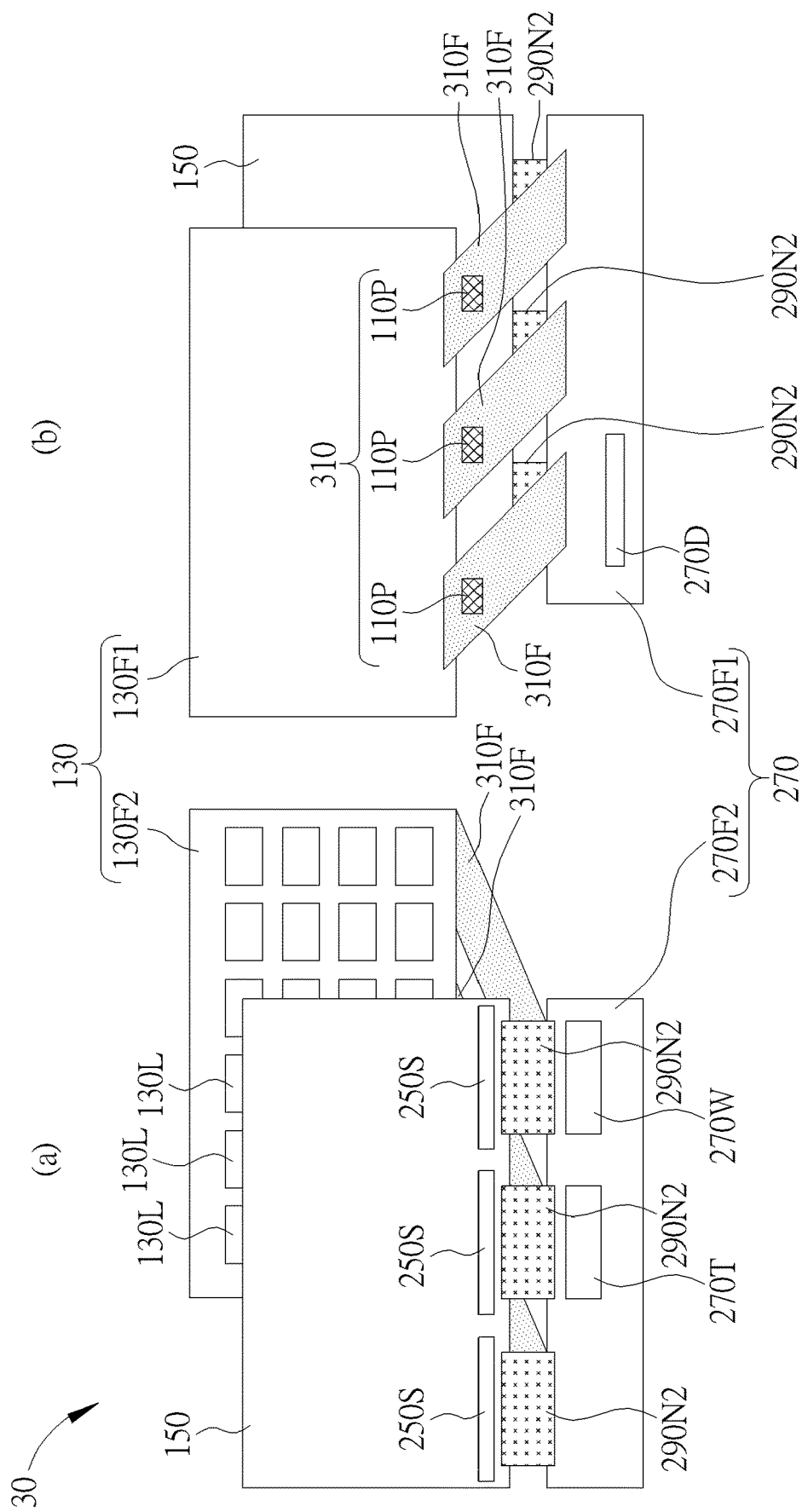

The backlight driver 210 is configured to drive the backlight module 130 instead of the display panel 150. The display panel 150 is driven by the source drivers 250S. FIG. 3 is a schematic diagram of a display apparatus 30 according to an embodiment of the present invention. FIG. 3a and FIG. 3b illustrate the display apparatus 30 in different views.

The driving chips 110P of a backlight driver 310 of the display apparatus 30 are respectively disposed on COF packages 310F of the backlight driver 310. The driving chips 110P respectively disposed on the COF packages 310F may be as far from the light emitters 130L as possible to solve overheating issues.

There may be no conventional FFC/FPC connection line (shown, for example, in FIG. 11) disposed between the backlight module 130 and the control PCB 270. Instead, the COF packages 310F are bonded between the backlight module 130 and the control PCB 270. In other words, a conventional FFC/FPC connection line is replaced with the COF package 310F. These facilitate the design of the control PCB 270.

With the COF packages 310F, the number of the connector heads 270H on the control PCB 270 may be reduced (to zero) to optimize the mechanism/structure of the control PCB 270 if compared with the combination of the COF package 210F and the connection line 290N1 shown in FIG. 2.

Figure 4:
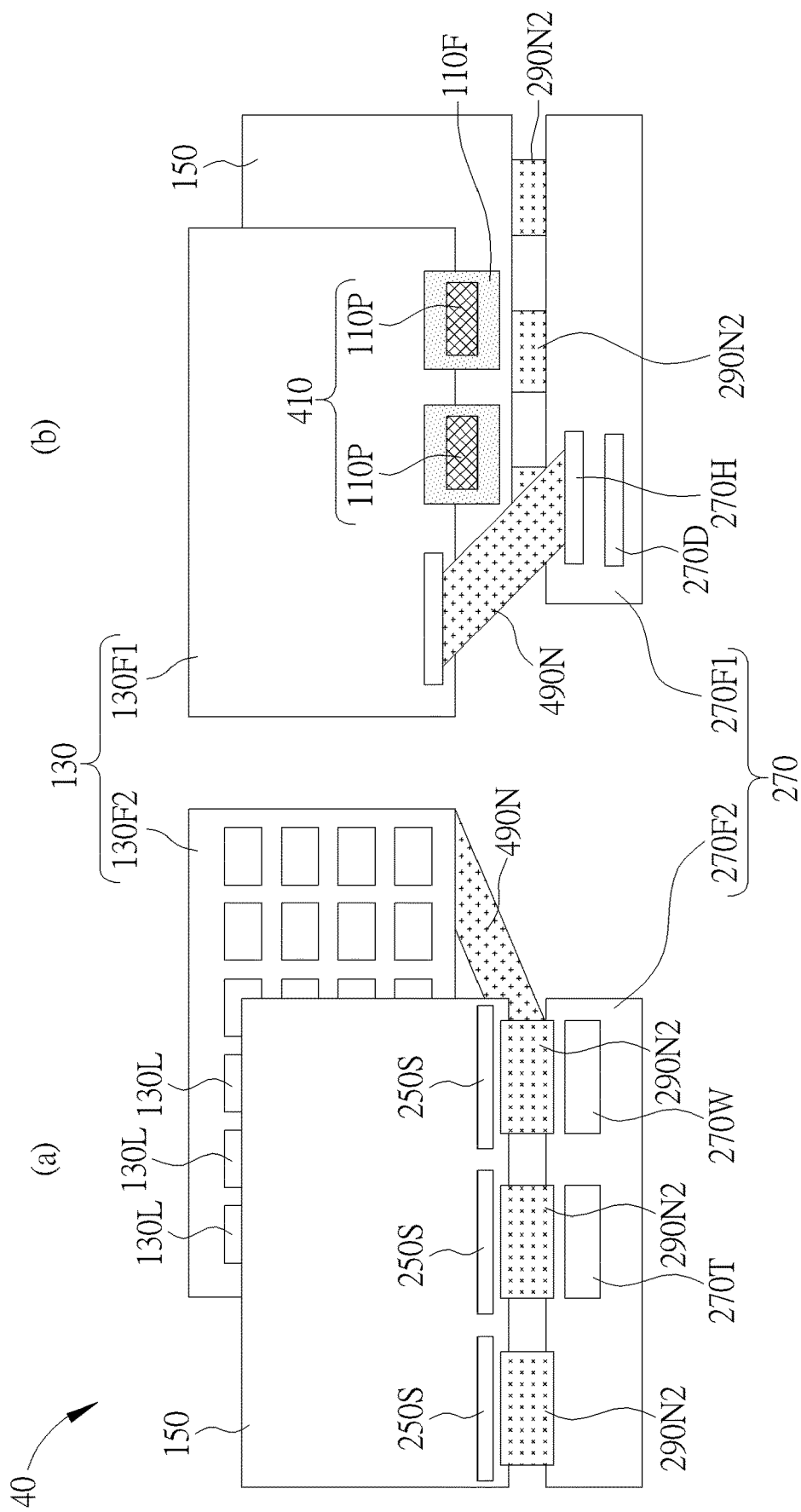

FIG. 4 is a schematic diagram of a display apparatus 40 according to an embodiment of the present invention. FIG. 4a and FIG. 4b illustrate the display apparatus 40 in different views.

The COF packages 110F of a backlight driver 410 of the display apparatus 40 are bonded merely to the backlight module 130 without being attached to the control PCB 270. For example, only one side of the COF package 110F in single-side lead/pad structure is bonded to the backlight module 130. The COF packages 110F being unilaterally/one-sided bonded to the backlight module 130 may free up even more space on the control PCB 270.

A connection line 490N is disposed between the backlight module 130 and the control PCB 270, for example, to transmit control signals to the driving chips 110P. The connection line 490N may be implemented by a conventional FFC/FPC connection line (as shown, for example, in FIG. 11).

The configuration of the display apparatus 40 may minimize the areas (reserved) for COF bonding and/or the connector heads 270H on the control PCB 270 if compared with the display apparatus 20 or 30.

Figure 5:
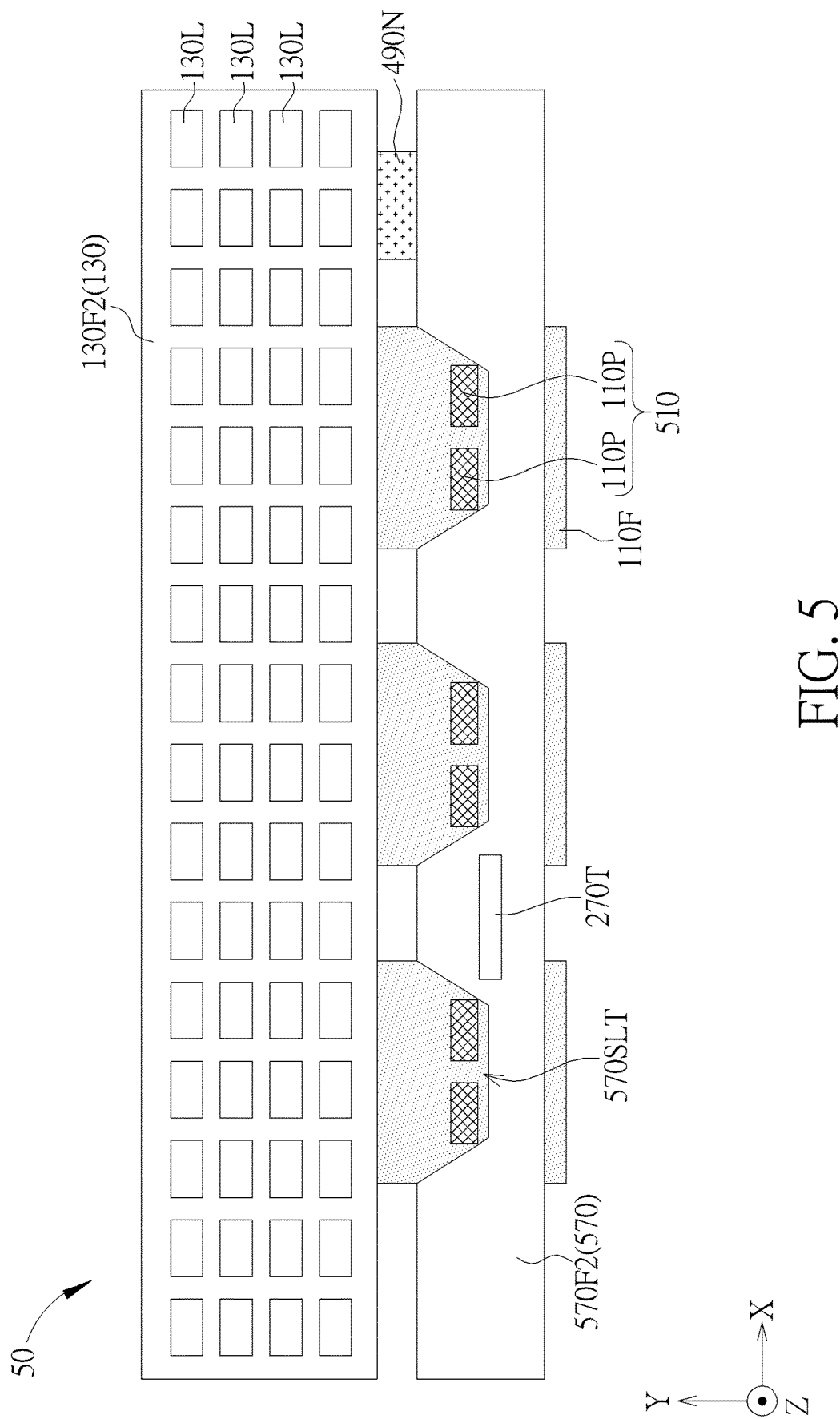

FIG. 5 is a schematic diagram of a display apparatus 50 according to an embodiment of the present invention.

Similar to the display apparatus 40, the connection line 490N is disposed between the backlight module 130 and a control PCB 570 of the display apparatus 50. The connection line 490N may be bonded to a surface of the control PCB 570 opposite to another surface 570F2 of the control PCB 570.

The control PCB 570 may have slots 570SLT, which may have similar/identical shape/size. The slots 570SLT may be evenly spaced or regularly arranged. The slots 570SLT are cut into a surface of the control PCB 570 (in the xz-plane) perpendicular to the surface 570F2. The power manager circuit 270W or the timing controller 270T may be disposed between two adjacent slots 570SLT and on the surface 570F2.

There may be more than one driving chip 110P of a backlight driver 510 of the display apparatus 50 bonded on one COF package 110F of the backlight driver 510. While the number of the driving chips 110P may not be equal to the number of the COF packages 110F, the number of the COF packages 110F may be the same as the number of the slots 570SLT.

The COF packages 110F may be arranged according to the location of the slots 570SLT. Similarly, the driving chips 110P may be disposed corresponding to where the slots 570SLT are located. For example, two driving chips 110P may be located within one slot 570SLT. With the gap between the two driving chips 110P, it may be easier to tuck the two driving chips 110P in one slot 570SLT. The area of one slot 570SLT (or the total area of the slots 570SLT) is larger than or equal to the area of the driving chips 110P within the slot 570SLT (or the total area of all the driving chips 110P). The thickness of the control PCB 570 (or the thickness of the control PCB 570 and the power manager circuit 270W or the timing controller 270T) may be greater than or equal to that of the driving chip 110P. That is, the thickness of the control PCB 570 (in the xz-plane) is great enough for the driving chips 110P to fit in/through. By accommodating/inserting the driving chips 110P in/into the slots 570SLT, the driving chips 110P and the control PCB 570 (and thus the power manager circuit 270W or the timing controller 270T) hardly interferes/overlaps so as to minimize the total thickness of the display apparatus 50.

The edge/corner of one driving chip 110P within one slot 570SLT may be in contact with and/or disposed against the edge of the slot 570SLT, such that the driving chip 110P is fixed in the slot 570SLT. At least one side of the slot 570SLT is nonparallel to one side of the driving chip 110P. For example, the slot 570SLT may be in the shape of a trapezoid.

Figure 6:
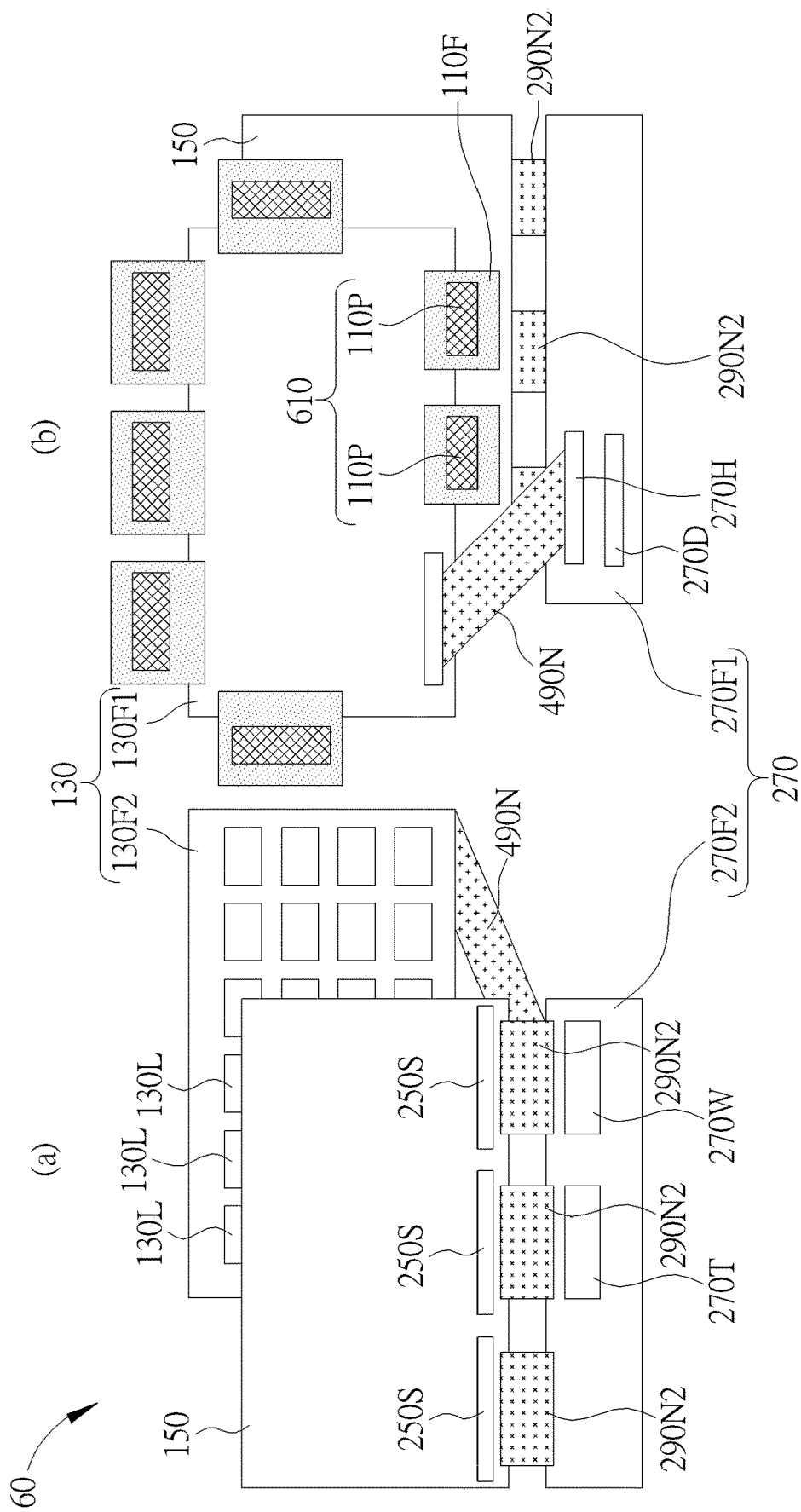

FIG. 6 is a schematic diagram of a display apparatus 60 according to an embodiment of the present invention. FIG. 6a and FIG. 6b illustrate the display apparatus 60 in different views.

The COF packages 110F of a backlight driver 610 of the display apparatus 60 are bonded to/around more than one side/edge of the backlight module 130 and thus surround the backlight module 130. The maximum number of the COF packages 110F (or driving chips 110P of the backlight driver 610) may thus increase. The display apparatus 60 may be adopted when the number of (local dimming) zones increases.

Figure 7:
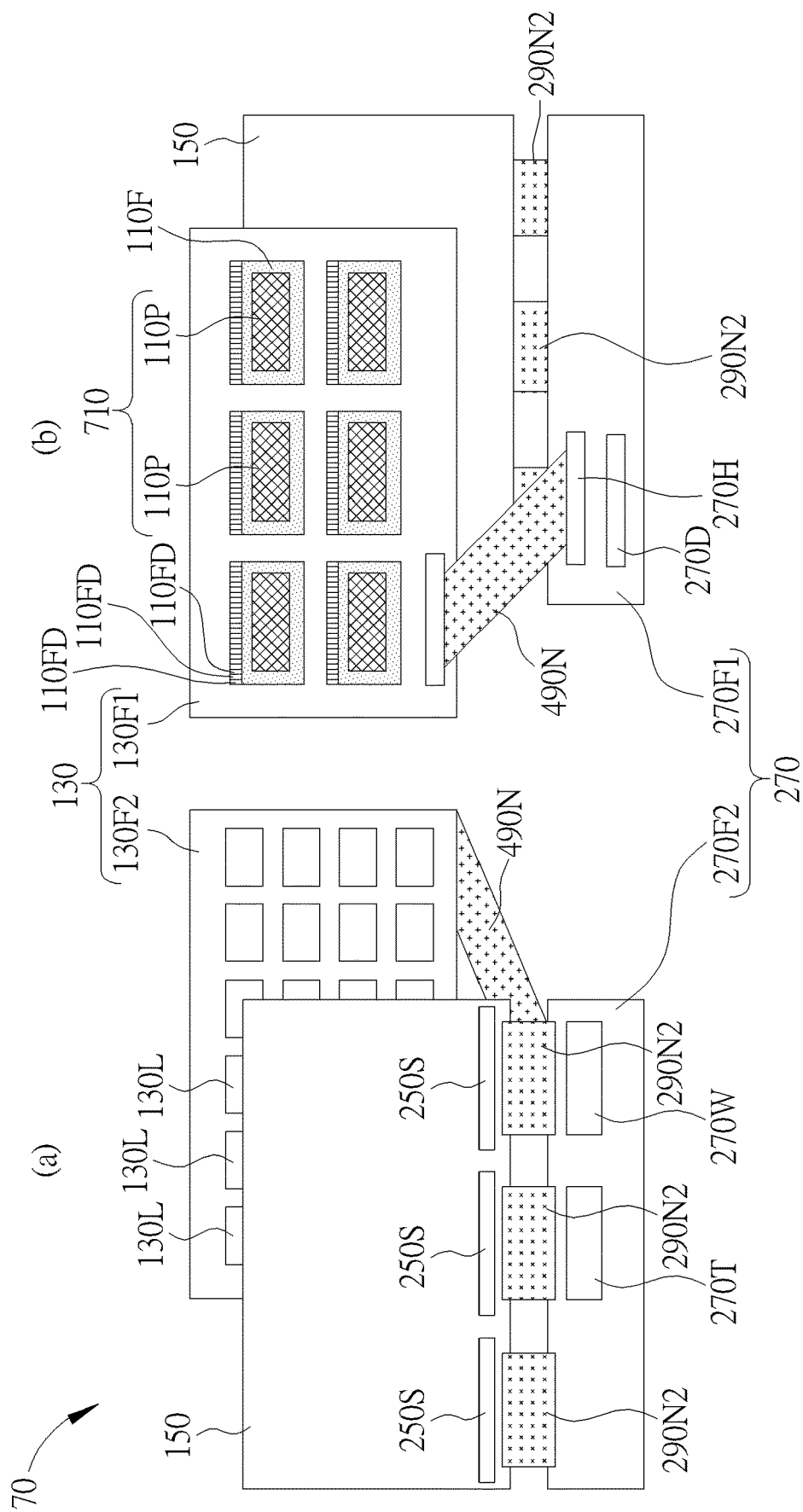

FIG. 7 is a schematic diagram of a display apparatus 70 according to an embodiment of the present invention. FIG. 7a and FIG. 7b illustrate the display apparatus 70 in different views.

The driving chips 110P of a backlight driver 710 of the display apparatus 70 are arranged in an m×n two-dimensional array with, for example, 2 rows and 3 columns, where m and n are integers. The maximum number of the driving chips 110P may thus increase. The display apparatus 70 may be adopted when the number of local dimming zones increases.

The COF packages 110F of the backlight driver 710 may be unilaterally/one-sided bonded to the first surface 130F1 of the backlight module 130. As shown in FIG. 7, merely one side of the COF package 110F in single-side lead/pad structure is bonded to the backlight module 130.

Figure 8:
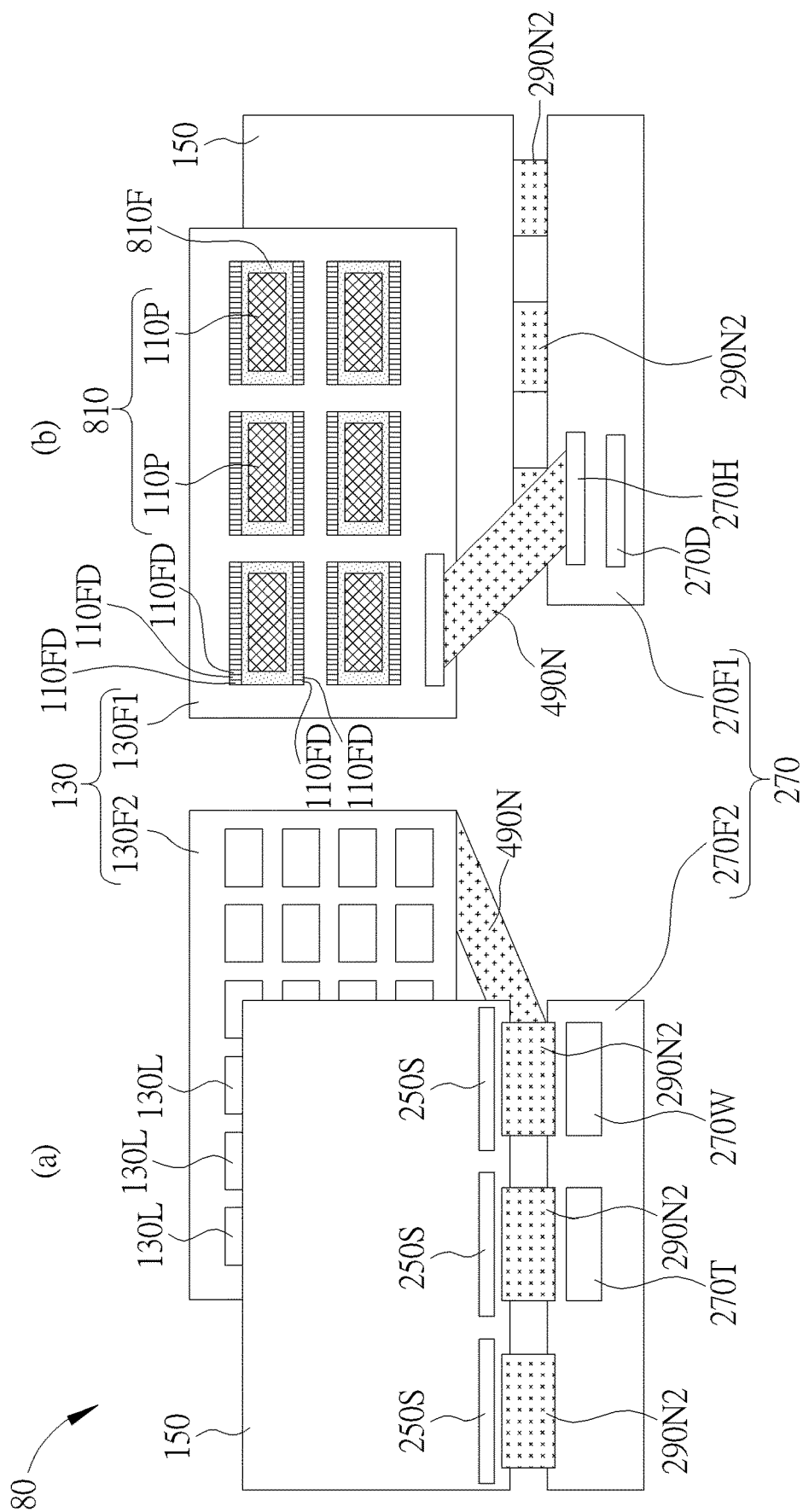

FIG. 8 is a schematic diagram of a display apparatus 80 according to an embodiment of the present invention. FIG. 8a and FIG. 8b illustrate the display apparatus 80 in different views.

Each COF package 810F of a backlight driver 810 may adopt double-side lead/pad structure. As shown in FIG. 8, more than one side of the COF package 810F is bonded to the first surface 130F1 of the backlight module 130. In FIG. 7, there are leads/pads 110FD at one edge of the COF package 110F; on the other hand, the leads 110FD shown in FIG. 8 are disposed at two edges of the COF package 810F. With more leads 110FD of the COF package 810F, the backlight driver 810 is able to integrate more current channels and drive more light emitters 130L.

The leads 110FD on one/both side(s) of the COF package 810F may correspond to the current channels. Specifically, the leads 110FD of the COF package 810F may include current output pin(s) to drive the light emitters 130L. Each current output pin may provide a current channel to transmit a current output. As the number of the current channels corresponding to one driving chip 110P increases, the temperature of the driving chip 110P may rise more rapidly/higher. In the approach of COF packaging, the driving chip 110P is not in direct contact with the backlight module 130, thereby solving overheating issues.

The leads 110FD of the COF package 810F may include a serial peripheral interface (SPI) signal interface to transmit command data and/or display data. The SPI signal interface is connected to the driving chip(s) 110P and serves as transmission interface(s) of the driving chip(s) 110P to control or to light/switch on the light emitters 130L. The SPI signal interface may receive command data and display data from an external controller (for instance, the timing controller 270T).

Figure 9:
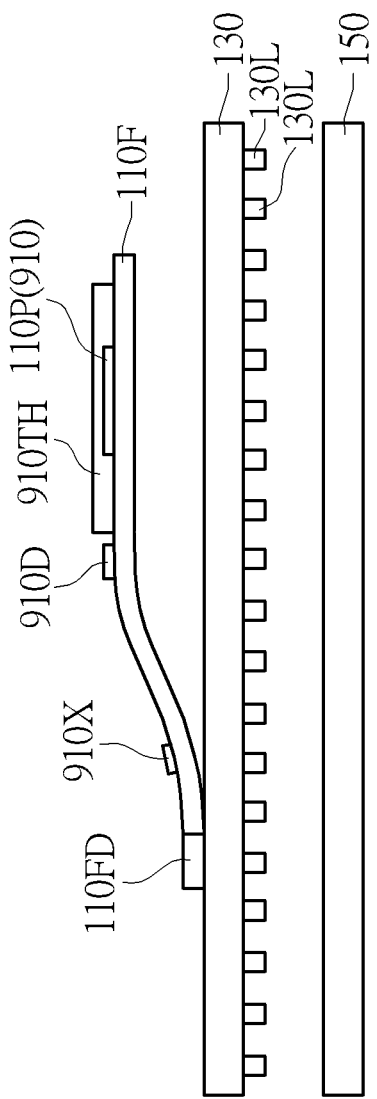

FIG. 9 is a schematic diagram of a display apparatus 90 according to an embodiment of the present invention. The display apparatus 90 includes a backlight driver 910, the backlight module 130, and/or the display panel 150.

A power control module 910D of the backlight driver 910 may be placed on the COF package 110F. The power control module 910D receives control signal(s) from the driving chip 110P of the backlight driver 910 and generates a voltage signal VLD to power the light emitters 130L. Specifically, to prevent excessive power consumed in the current channel(s) when the light emitters 130L are lit, the system power consumption is optimized by controlling the voltage signal VLD. After the driving chip 110P detects the voltage across each string of the light emitters 130L connected in series (or each current channel), the driving chip 110P determines/calculates the control signal and feeds the control signal to the power control module 910D. The power control module 910D determines/calculates the voltage signal VLD according to the control signal.

The voltage signal VLD may be the minimum voltage to light/switch on all the light emitters 130L within one string. The voltage signal VLD for one string of the light emitters 130L connected in series may be a function of the number of the light emitters 130L connected in series.

The power control module 910D may be a boost circuit such as a DC-DC (direct current) boost circuit. With the power control module 910D, a lower input voltage may be boosted to a high voltage, which is high enough to light/switch on one string of the light emitters 130L, according to the number of the light emitters 130L in one string.

In an embodiment, external components 910X (such as inductors, capacitors or resistors) for the driving chip 110P may lie on the COF package 110F to reduce the number of components on the backlight module 130 and/or to make wiring on the backlight module 130 easier. In another embodiment, the external components 910X are arranged on the backlight module 130.

As set forth above, COF packaging is a direct placement of the driving chip 110P on to the COF package 110F, which is used as a carrier, by, for example, thermocompression bonding. Current output pin(s) of the driving chip 110P is/are connected to (the current output pin(s) of) the leads 110FD of the COF package 110F, which is attached to the backlight module 130 to drive the light emitters 130L. By fabricating the backlight driver 90 in the approach of COF packaging, current channels and transmission signal(s) may be connected/transmitted to the backlight module 130 through the leads 110FD of the COF package 110F. The driving chips 110P are not in direct contact with the backlight module 130 because the direct contact may transfer heat, which affects display quality and service life of the light emitters 130L.

Additionally, a thermal pad 910TH may be disposed on the COF package 110F and/or cover the driving chip 110P to improve heat dissipation further.

In an embodiment, the driving chip 110P may be in contact with a housing for the display apparatus 90. In another embodiment, the driving chip 110P may be sandwiched between the COF package 110F and the thermal pad 910TH, which is in contact with the housing enclosing the backlight driver 910.

Figure 10:
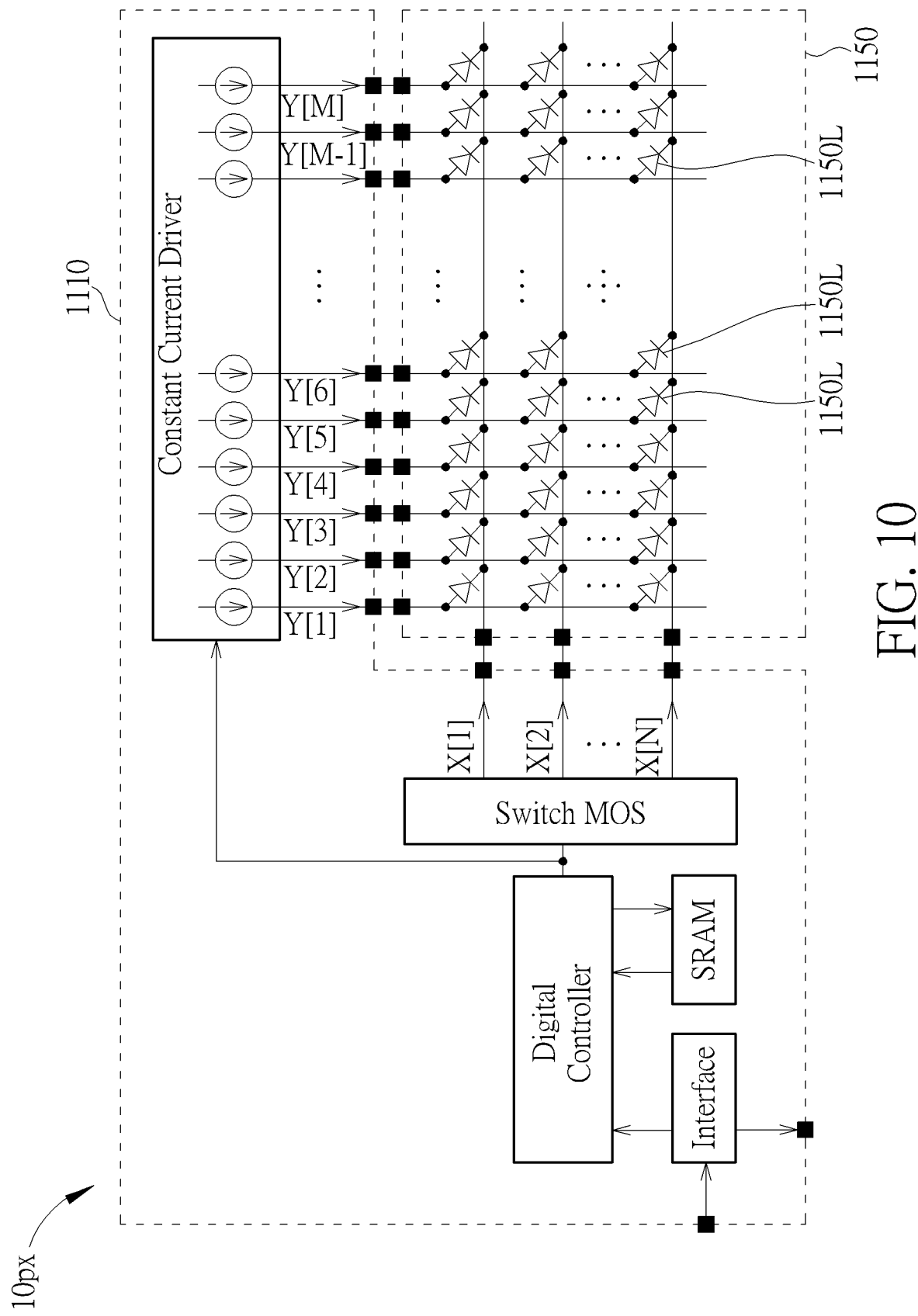

FIG. 10 is a schematic diagram of a display apparatus 10px according to an embodiment of the present invention. The display apparatus 10px may include a display driver 1110 and/or a display panel 1150. There is neither backlight module nor backlight driver in the display apparatus 10px.

The display panel 1150 includes light emitters 1150L arranged in an array. Similar to the light emitters 130L, each light emitter 1150L may be an LED or a mini LED. However, each light emitter 1150L may serve as a (display) pixel/subpixel to display an image, and may function/light up in a spatial/temporal manner different from the light emitters 130L of the backlight module 130 even when the same image is display.

Similar to the backlight driver 110, the display driver 1110, which adopts a chip-on-film (COF) package, may include a COF package and/or a driving chip. Yet the driving chip is configured to drive the display panel 1150 so as to display an image. The driving chip of the display driver 1110 may include an interface, a (digital) controller, a memory (SRAM), a switch (MOS), and/or a constant current driver as shown in FIG. 10.

Similar to the backlight driver 110, the driving chip of the display driver 1110 is disposed on the COF package and may thus be not in direct contact with the display panel 1150 to reduce/block heat transfer to the display panel 1150. FIGS. 1-9 are embodiments of the backlight driver 110, and those features may be also applied to the display driver 1110. The similar parts of the backlight driver 110 and the display driver 1110 are not detailed redundantly.

To sum up, the driving chips are not in direct contact with the backlight module to reduce heat transfer to the backlight module. This may improve the reliability of the backlight module and/or alleviate a color cast problem of the backlight module caused by the driving chips.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light emitting diode (LED) backlight driver, comprising:
   at least one driving chip, configured to drive a backlight module, wherein the at least one driving chip is disposed on at least one chip-on-film (COF) package, and not in direct contact with the backlight module to reduce heat transfer to the backlight module,
   wherein each of the at least one driving chip is disposed corresponding to where one of at least one slot of a control PCB is located.

2. The LED backlight driver of claim 1, wherein the at least one driving chip is not in direct contact with a control printed circuit board (PCB) to reduce heat transfer to the control PCB.

3. The LED backlight driver of claim 1, wherein the at least one COF package are arranged in a two-dimensional array or a one-dimensional array, or surround the backlight module.

4. The LED backlight driver of claim 1, wherein the at least one COF package are bonded on the backlight module or bonded around at least one edge of the backlight module, the backlight module is connected to a control PCB through at least one first flexible printed circuit (FPC) or at least one first flexible flat cable (FFC), the at least one first FPC or the at least one first FFC is attached to the control PCB, a timing controller is disposed on the control PCB, the control PCB is connected to an LCD panel through at least one second FPC or at least one second FFC.

5. The LED backlight driver of claim 1, wherein the at least one COF package are bonded to a first surface of the backlight module, and a plurality of light emitters are bonded to a second surface of the backlight module, the second surface is opposite to the first surface.

6. The LED backlight driver of claim 1, wherein each of the at least one COF package is bonded only to the backlight module, or bonded between a control PCB and the backlight module.

7. The LED backlight driver of claim 1, wherein each of the at least one COF package is bonded between the backlight module and a flexible printed circuit (FPC) or a flexible flat cable (FFC), the FPC or the FFC is connected to a control PCB via a connector head, and a timing controller is disposed on the control PCB.

8. The LED backlight driver of claim 1, wherein one or more of the at least one driving chip is fixed in one of the at least one slot of the control PCB, and an edge or a corner of one of the at least one driving chip is disposed against an edge of one of the at least one slot.

9. The LED backlight driver of claim 1, wherein each of the at least one slot of the control PCB is in the shape of a trapezoid.

10. The LED backlight driver of claim 1, wherein each light emitter of the backlight module is a light emitting diode, and the backlight module is an LED backlight module disposed behind a liquid-crystal display (LCD) panel.

11. A light emitting diode (LED) display driver, for driving display pixels, comprising:
   at least one driving chip, configured to drive the display pixels of an LED display panel, wherein the at least one driving chip is disposed on at least one chip-on-film (COF) package, and not in direct contact with the LED display panel to reduce heat transfer to the LED display panel,
   wherein each of the at least one driving chip is disposed corresponding to where one of at least one slot of a control PCB is located.

12. The LED display driver of claim 11, wherein the at least one driving chip is not in direct contact with a control printed circuit board (PCB) to reduce heat transfer to the control PCB.

13. The LED display driver of claim 11, wherein the at least one COF package are arranged in a two-dimensional array or a one-dimensional array, or surround the LED display panel.

14. The LED display driver of claim 11, wherein the at least one COF package are bonded on the LED display panel or bonded around at least one edge of the LED display panel, the LED display panel is connected to a control PCB through at least one first flexible printed circuit (FPC) or at least one first flexible flat cable (FFC), the at least one first FPC or the at least one first FFC is attached to the control PCB, a timing controller is disposed on the control PCB.

15. The LED display driver of claim 11, wherein the at least one COF package are bonded to a first surface of the LED display panel, and a plurality of light emitters are bonded to a second surface of the LED display panel, the second surface is opposite to the first surface.

16. The LED display driver of claim 11, wherein each of the at least one COF package is bonded only to the LED display panel, or bonded between a control PCB and the LED display panel.

17. The LED display driver of claim 11, wherein each of the at least one COF package is bonded between the LED display panel and a flexible printed circuit (FPC) or a flexible flat cable (FFC), the FPC or the FFC is connected to a control PCB via a connector head, and a timing controller is disposed on the control PCB.

18. The LED display driver of claim 11, wherein one or more of the at least one driving chip is fixed in one of the at least one slot of the control PCB, and an edge or a corner of one of the at least one driving chip is disposed against an edge of one of the at least one slot.

19. The LED display driver of claim 11, wherein each of the at least one slot of the control PCB is in the shape of a trapezoid.

* * * * *